US009554396B2

(12) United States Patent
Damodaran

(10) Patent No.: US 9,554,396 B2
(45) Date of Patent: Jan. 24, 2017

(54) MULTI-INTERFACE WLAN DEVICE WITH TIME ARBITRATION MESSAGING

(71) Applicant: Broadcom Corporation, Irvine, CA (US)

(72) Inventor: Deepak Kumar Damodaran, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 129 days.

(21) Appl. No.: 14/041,594

(22) Filed: Sep. 30, 2013

(65) Prior Publication Data

US 2015/0092736 A1 Apr. 2, 2015

(51) Int. Cl.
*H04W 72/12* (2009.01)
*H04W 74/00* (2009.01)
*H04W 84/12* (2009.01)
*H04W 88/06* (2009.01)

(52) U.S. Cl.
CPC ....... *H04W 72/1215* (2013.01); *H04W 74/002* (2013.01); *H04W 84/12* (2013.01); *H04W 88/06* (2013.01)

(58) Field of Classification Search
CPC .. H04W 88/06; H04W 16/14; H04W 72/1215; H04W 84/12; H04W 4/008; H04W 52/0216
See application file for complete search history.

(56) References Cited

U.S. PATENT DOCUMENTS

| 2004/0013128 | A1* | 1/2004 | Moreton | H04W 74/02 370/447 |
| 2005/0208956 | A1* | 9/2005 | Takagi | H04W 74/0808 455/464 |
| 2006/0193287 | A1* | 8/2006 | Ooshima | H04W 88/02 370/328 |
| 2006/0292987 | A1* | 12/2006 | Ophir et al. | 455/41.2 |
| 2010/0015929 | A1* | 1/2010 | Kitchin | H04W 16/14 455/73 |
| 2010/0020773 | A1* | 1/2010 | Jechoux | 370/338 |
| 2011/0255455 | A1* | 10/2011 | Seok | H04W 36/06 370/311 |
| 2012/0120836 | A1* | 5/2012 | Lewis | 370/252 |
| 2013/0142124 | A1* | 6/2013 | Abraham et al. | 370/328 |
| 2014/0045520 | A1* | 2/2014 | Lim et al. | 455/456.1 |

* cited by examiner

*Primary Examiner* — Curtis A Alia
(74) *Attorney, Agent, or Firm* — Sterne, Kessler, Goldstein & Fox P.L.L.C.

(57) ABSTRACT

A wireless local area network (WLAN) method and device to provide dual band (DB) operation of the WLAN device, the DB operation including communication in a first frequency band with a first device and communication in a second frequency band with a second device, the WLAN device including first network interface circuitry to support communication in the first frequency band with the first device, second network interface circuitry to support communication in the second frequency band with the second device, and a processor to generate at least one action frame that includes information regarding a duration of time during which the WLAN device will be unavailable for communication, and to enable transmission of the at least one action frame to the first device or to the second device.

19 Claims, 8 Drawing Sheets

MULTI-INTERFACE WLAN DEVICE WITH TIME ARBITRATION MESSAGING

FIELD OF THE DISCLOSURE

The present disclosure is directed to systems and methods related to multi-interface wireless local area network (WLAN) devices with time arbitration messaging.

BACKGROUND

Wi-Fi is a popular technology that allows an electronic device to exchange data or connect to the internet wirelessly. Wi-Fi may be implemented using WLAN devices that function based on 802.11 standards defined by the Institute of Electrical and Electronics Engineers (IEEE). The 802.11ac standard from among the 802.11 standards is capable of providing a very high throughput (e.g., 1 Gbps). Also, the peer-to-peer (P2P) technology is an evolving technology that is introducing a number of new applications that may be implemented in the WLAN devices. Therefore, it is possible to realize very high throughput in the WLAN devices through Wi-Fi while the WLAN devices are also using P2P applications.

DETAILED DESCRIPTION

For purposes of this discussion, the term "module" or "unit" shall be understood to include one or more of software, firmware, or hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

The present disclosure provides mechanisms to implement systems that allow realization of high throughput (e.g., in the range of 1 Gbps) while the WLAN products are using the P2P use cases/applications. For example, the present disclosure introduces multi interface WLAN devices that simultaneously support more than one Wi-Fi network interface. These WLAN devices are capable of providing an interface that simultaneously supports, for example, wireless Internet activity over a first frequency band and wireless P2P activity over a second frequency band. Such a mode, in which the WLAN device simultaneously supports communication activity with separate devices over separate frequency bands, is called the simultaneous dual band (SDB) mode.

Figure 1:
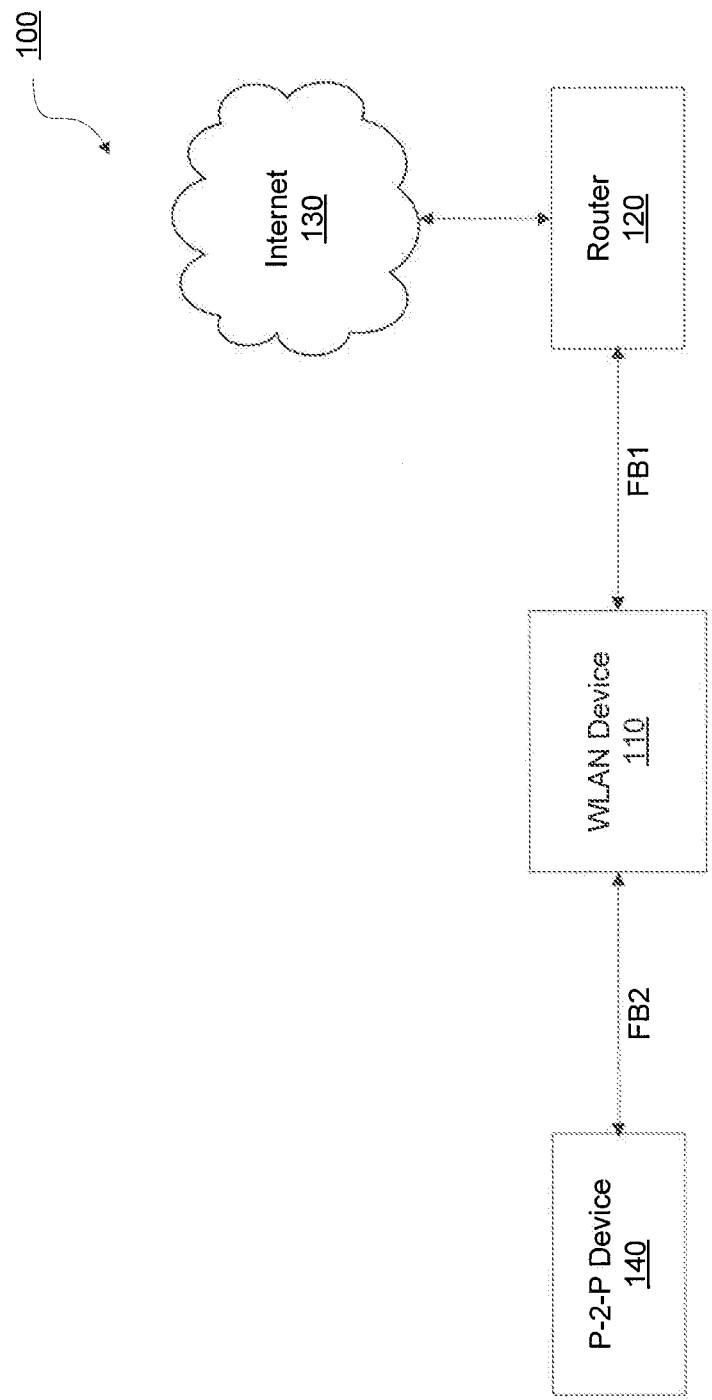
FIG. 1 illustrates an exemplary system for implementing a simultaneous dual band (SDB) system according to an embodiment of the present disclosure.

FIG. 1 illustrates an exemplary SDB system 100 according to an embodiment of the present disclosure. The SDB system 100 includes a WLAN device 110, a router 120 which provides access to the Internet 130, and a P2P device 140. The WLAN device 110 is simultaneously connected to (i) the router 120 over a first frequency band FB1 (e.g., 2.4 GHz) and to (ii) the P2P device 140 over a second frequency band FB2 (e.g., 5 GHz). In this way, the WLAN device 110 may support simultaneous communication activity with the router 120 and with the P2P device 140 over different frequency bands. In one embodiment, the WLAN device 110 may support communication activity with the Internet through the P2P device 140. For example, the WLAN device 110 may simultaneously communicate with the P2P device 140 over the first frequency band FB1 and also over the second frequency band FB2.

In an exemplary embodiment, the WLAN device 110 may be a mobile tablet or smart phone that allows a user to stream an online movie on a television. In this embodiment, the mobile tablet supports simultaneous communication activity with the Internet to download the contents of the online movie over a first frequency band, and peer-to-peer activity with the television to relay the downloaded contents of the online movie over a second frequency band.

The following discussion will illustrate an embodiment of the SDB system 100, namely a virtual SDB system 200. Other embodiments will be realized by those skilled in art based on the discussion provided herein, where these other embodiments are within the scope and spirit of the present disclosure.

Figure 2:
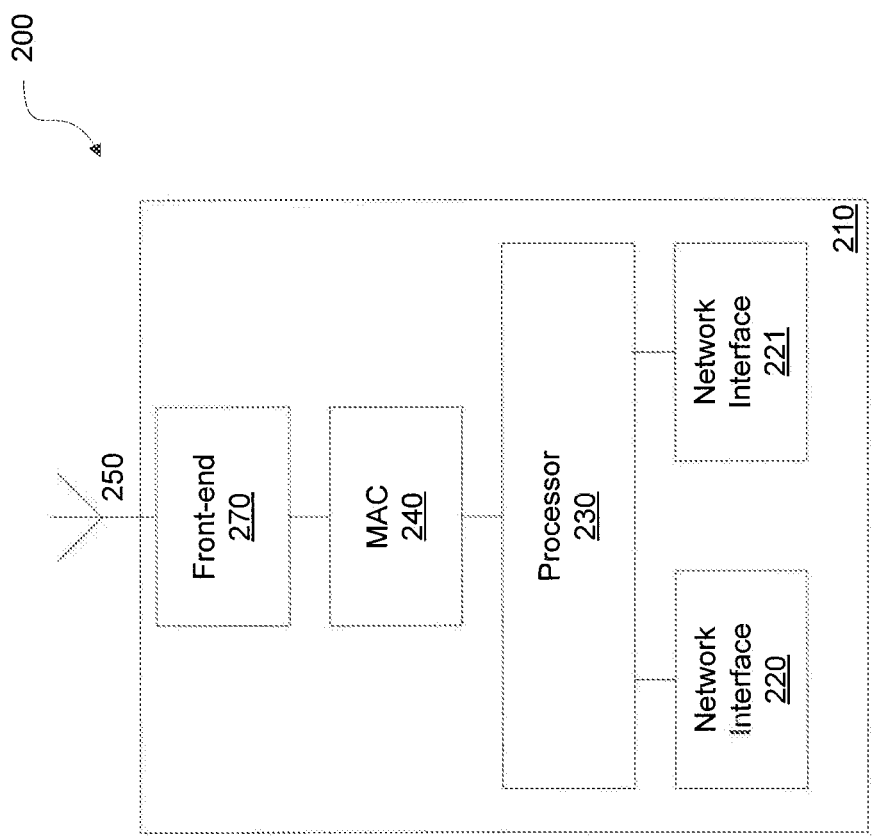
FIG. 2 illustrates an exemplary virtual SDB system 200 according to an embodiment of the present disclosure.

FIG. 2 illustrates an exemplary virtual SDB system 200 according to an embodiment of the present disclosure. The virtual SDB system 200 includes WLAN device 210. The WLAN device 210 includes an antenna 250 that is capable of communicating with the router 120 in a first frequency band FB1 (e.g., 2.4 GHz) and with a P2P device in a second frequency band FB2 (e.g., 5 GHz). The single antenna 250 is supported by network interface circuitry including front-end 270, a MAC 240, a processor 230, and network interfaces 220, 221.

In the WLAN device 210, the front-end 270 may include a radio unit and a PHY unit. In the receive path, the radio unit may be used for frequency down-converting the analog signal from the antenna 240 and for converting the analog signal into a digital signal. The PHY unit may be used to perform demodulation and error detection/correction on the digital signal to be processed by the MAC 240. The MAC 240 may perform layer-2 functionality including additional error correction, message de-framing, message routing, and other processing according to the governing protocol. In the transmit path, the MAC 240 may be used to receive the digital signal from the network interface 220, 221 or another source and to perform layer-2 functionality including media arbitration, message framing, addressing, and the like. The PHY unit in the front-end 270 may be used to perform modulation and any forward error detection, and the radio unit may perform digital to analog conversion, frequency up-conversion and any RF amplification in preparation for transmission by antenna 250. In this embodiment, the front-end 270 is configured to operate over both frequency band FB1 and FB2, using for example, frequency tunable components.

Since the WLAN device 210 includes a single front-end 270 and a single MAC 240, the dual band communication through the antenna 250 may be switched between the two frequency bands (or channels) based on, for example, time division multiplexing to achieve the virtual simultaneous communication. For example, in the virtual SDB system 200, the WLAN device 210 may achieve the virtual simultaneous communication by dividing, equally or unequally, a predefined communication time slot between the two frequency bands. The predefined communication timeslot maybe in accordance with a communication protocol used by the WLAN device 210, such as IEEE protocols 802.11 a/b/g/n/ac (e.g., Wi-Fi).

Figure 3:
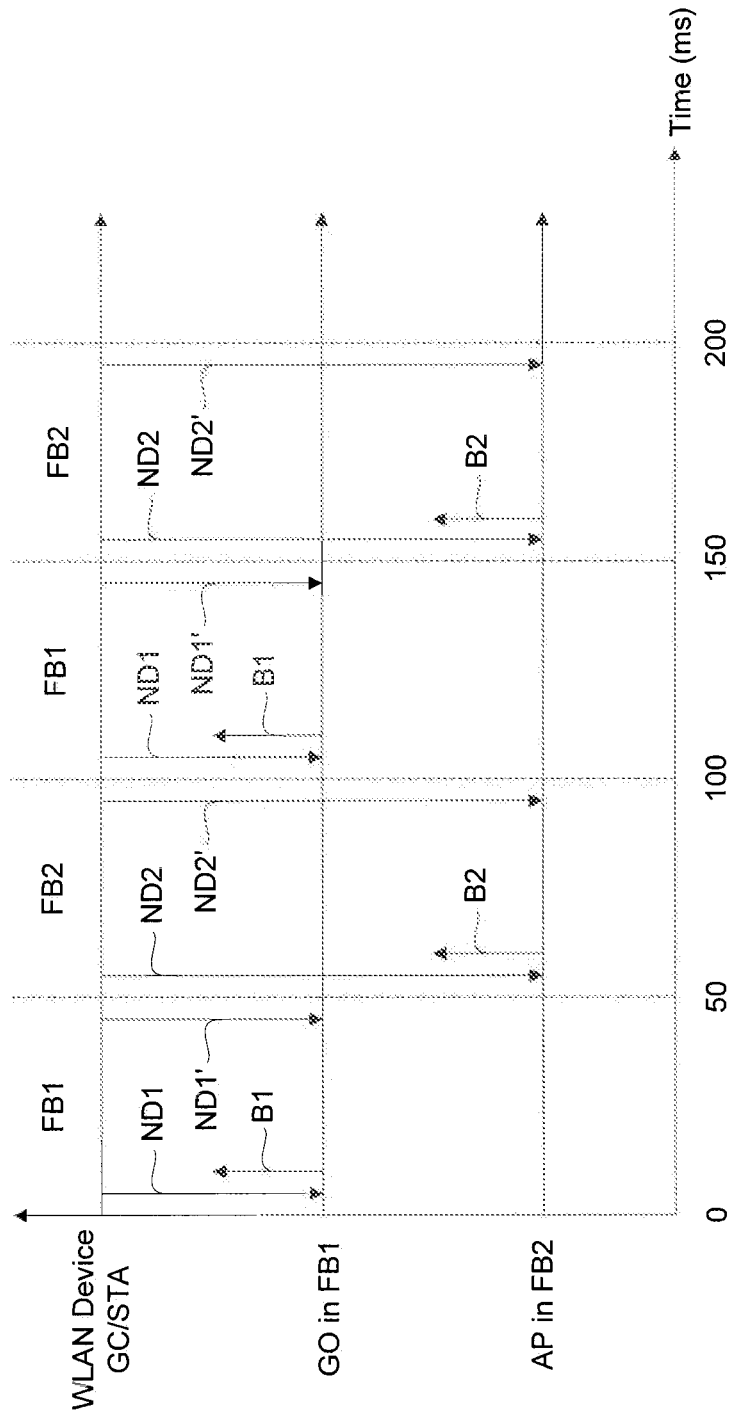
FIG. 3 illustrates an exemplary graph showing operation of a virtual WLAN device according to an embodiment of the present disclosure.

FIG. 3 illustrates an exemplary graph showing operation of the virtual WLAN device 210 during the predefined communication time slots according to an embodiment of the present disclosure. In this embodiment, the WLAN device 210 operates during a predefined communication time slot of, for example, 100 ms, and the communication time slot is equally divided into a first time slot portion for communication in the first frequency band FB1 and into a second time slot portion for communication in the second frequency band FB2. Therefore, in a given predefined communication time slot, the WLAN device 210 communicates in the first frequency band FB1 for 50 ms (first time slot portion) and then switches to communicate in the second frequency band FB2 for 50 ms (second time slot portion). Other time periods and divisions could be used as will be understood by those skilled in the arts. In other words, the time slot could be unevenly divided between the first and second portions.

In one embodiment, in the first frequency band FBI, the WLAN device 210 may operate as a Group Owner (GO) to communicate with a Group Client (GC) or may operate as a Group Client to communicate with a Group Owner. Similarly, in one embodiment, in the second frequency band FB2, the WLAN device 210 may operate as a Station (STA) to communicate with an Access Point (AP) or may operate as an Access Point to communicate with a Station. For example, the WLAN device 210 may operate as a Group Owner to communicate with the Group Client, P-2-P device 140, in the first frequency band FB1, and may operate as the Station to communicate with the Access Point, router 120, in the second frequency band FB2.

In the embodiment illustrated in FIG. 3, the WLAN device 210 is assumed to be operating as a Group Client to communicate with a Group Owner in the first frequency band FB1, and to be operating as a Station to communicate with an Access Point in the second frequency band FB2. For example, in this embodiment, the WLAN device 210 operates as a Group Client to communicate with a Group Owner in the first frequency band FB1 during the first 50 ms portion of the predefined time slot, and then switches to operate as a Station to communicate with an Access Point in the second frequency band FB2 during the second 50 ms portion of the predefined time slot. As part of the communication, the WLAN device 210 receives beacon B1 from the Group Owner and receives, beacon B2 from the Access Point. These respective beacons are frames that are periodically received (e.g., every 100 ms) by the WLAN device 210 for the purposes of recognizing the current or updated capabilities of the Group Owner and/or the Access Point, and of enabling or maintaining synchronization of the WLAN device 210 with the Group Owner and/or the Access Point.

Now, during the first 50 ms portion of the predefined time slot, when the WLAN device 210 is communicating as the Group Client with the Group Owner in the first frequency band FB1, the WLAN device 210 is unable to communicate (receive or transmit) with the Access Point in the second frequency band FB2. Similarly, during the second 50 ms portion of the predefined time slot, when the WLAN device 210 is communicating as the Station with the Access Point in the second frequency band FB2, the WLAN device 210 is unable to communicate (receive or transmit) with the Group Owner in the first frequency band FB1. Therefore, during the first 50 ms portion of the predefined time slot, when the WLAN device 210 is communicating in the first frequency band FB1 with the Group Owner, the Access Point should be informed that the Access Point should not transmit any data to the WLAN device 210 because, as discussed above, the WLAN device 210 would be unable to receive the data transmitted from the Access Point. Further, any data transmitted by the Access Point to the WLAN device 210 during the first 50 ms portion of the predefined time slot may possibly cause some interference with the communication between the WLAN device 210 and the Group owner in the first frequency band FB1. For similar reasons, during the second 50 ms portion of the predefined time slot, when the WLAN device 210 is communicating in the second frequency band FB2 with the Access Point, the Group Owner should be informed that the Group Owner should not transmit any data to the WLAN device 210.

However, the Group Owner and/or the Station are unaware that the WLAN device 210 is operating in a virtual SDB system. For example, the Group Owner or the Access Point is unaware that the WLAN device 210 communicates in the first frequency band FB1 (for 50 ms) and then switches to communicate in the second frequency band FB2 (for 50 ms). Further, the Group Owner or the Access Point is unaware of the interval of time for which the WLAN device 210 will be unavailable for communication. Therefore, to increase efficiency and to avoid interference or loss of data, it is useful that the Group Owner and/or the Access Point be informed of the virtual SDB operation of the WLAN device 210 and also of the time interval for the WLAN device 210 will be unavailable for communication.

In one embodiment, the WLAN device 210 may inform the Group Owner and/or the Access Point of the virtual SDB operation of the WLAN device 210 in the following way. When the WLAN device 210 is communicating with the Group Owner in the first frequency band FB1 and prior to switching out from the first time slot portion to the second time slot portion, the WLAN device 210 may inform the Group Owner that the WLAN device 210 is going to stop communicating with the Group Owner. Additionally or optionally, upon switching into the second time slot portion, the WLAN device 210 may inform the Access Point that the WLAN device 210 is ready to communicate with the Access Point in the second frequency band FB2. Similarly, when the WLAN device 210 is communicating with the Access Point in the second frequency band FB1 and prior to switching out from the second time slot portion, the WLAN device 210 may inform the Access Point that the WLAN device 210 is going to stop communicating with the Access Point. Additionally or optionally, upon switching into the first time slot portion, their WLAN device 210 may inform the Group Owner that the WLAN device 210 is ready to communicate with the Group Owner.

In one embodiment, the WLAN device 210 may inform the Group Owner and/or the Access Point about the above discussed switching in and out of the time slot portions by transmitting a null data frame (ND). For example, the WLAN device 210 may transmit a null data frame with a "power save" bit set at logic high ND1', ND2' to inform the Group Owner and/or the Access Point, that the WLAN device 210 is about to switch out from the current time slot portion. Also, the WLAN device 210 may transmit a null data frame with the "power save" bit set at logic low ND1, ND2 to inform the Group Owner and/or the Access Point that the WLAN device 210 has switched into the current time slot portion.

In the embodiment illustrated in FIG. 3, the WLAN device 210 may transmit a null data frame with the "power save" bit set at logic low ND1 to inform the Group Owner that the WLAN device 210 has switched into the current time slot portion (of 0-50 ms) and is ready to communicate with the Group Owner. The WLAN device 210 may receive the beacon B1 from the Group Owner. Near the end of the current timeslot portion, the WLAN device 210 may transmit a null data frame with a "power save" bit set at logic high ND1' to inform the Group Owner that the WLAN device 210 is about to switch out from the current time slot portion (of 0-50 ms) and to stop communicating with the Group Owner. The WLAN device 210 may then switch from the first (0-50 ms) time slot portion to the second (50-100 ms) time slot portion. Upon switching into the second time slot portion, the WLAN device 210 may transmit a null data frame with the "power save" bit set at logic low ND2 to inform the Access Point that the WLAN device 210 has switched into the current time slot of portion (of 50-100 ms) and is ready to communicate with the Access Point. The WLAN device 210 may receive the beacon B2 from the Access Point. Near the end of the time slot portion, the WLAN device 210 may transmit a null data frame with a "power save" bit set at logic high ND2' to inform the Access Point that the WLAN device 210 is about to switch out from the current time slot portion (of 50-100 ms) and to stop communicating with the Access Point, and so on.

Now, it would be useful for the WLAN device 210 to further inform the Group Owner and/or the Access Point of the duration/interval of time for which the WLAN device 210 will be unavailable for communication for the following reasons. First, the transmission of the null data frame with a "power save" bit set at logic high ND1', ND2' to inform the Group Owner and/or the Access Point that the WLAN device 210 is about to switch out from the current time slot portion does not inform the Group Owner and/or the Access Point of the duration/interval of time for which the WLAN device 210 will be unavailable for communication. For example, the transmission of the null data frame ND1' simply informs the Group Owner that the WLAN device 210 is about to stop communicating with the Group Owner and that the WLAN device 110 will be unavailable for communication with the Group Owner, but does not inform the Group Owner of the duration/interval of time for which the WLAN device 210 will be unavailable for communication to the Group Owner. It would be useful for the WLAN device 210 to inform the Group Owner of the duration/interval of time for which the WLAN device 210 will be unavailable for communication to the Group Owner because this will allow the Group Owner to itself enter, for that duration/interval of time, a power save mode to save power rather than waiting to receive further communication from the WLAN device 210. Alternatively, if the Group Owner is also capable of SDB operation, then the Group Owner may, for that duration/interval of time, make itself available to another device for communication. Similarly, it would be useful for the WLAN device 210 to inform the Access Point of the duration/interval of time for which the WLAN device 210 will be unavailable for communication to the Access Point because this will allow the Access Point to itself enter, for that duration/interval of time, a power save mode to save power rather than waiting to receive further communication from the WLAN device 210. Alternatively, if the Access Point is also capable of SDB operation, then the Access Point may, for that duration/interval of time, make itself available to another device for communication. This will improve the overall efficiency of the SDB system.

Figure 4:
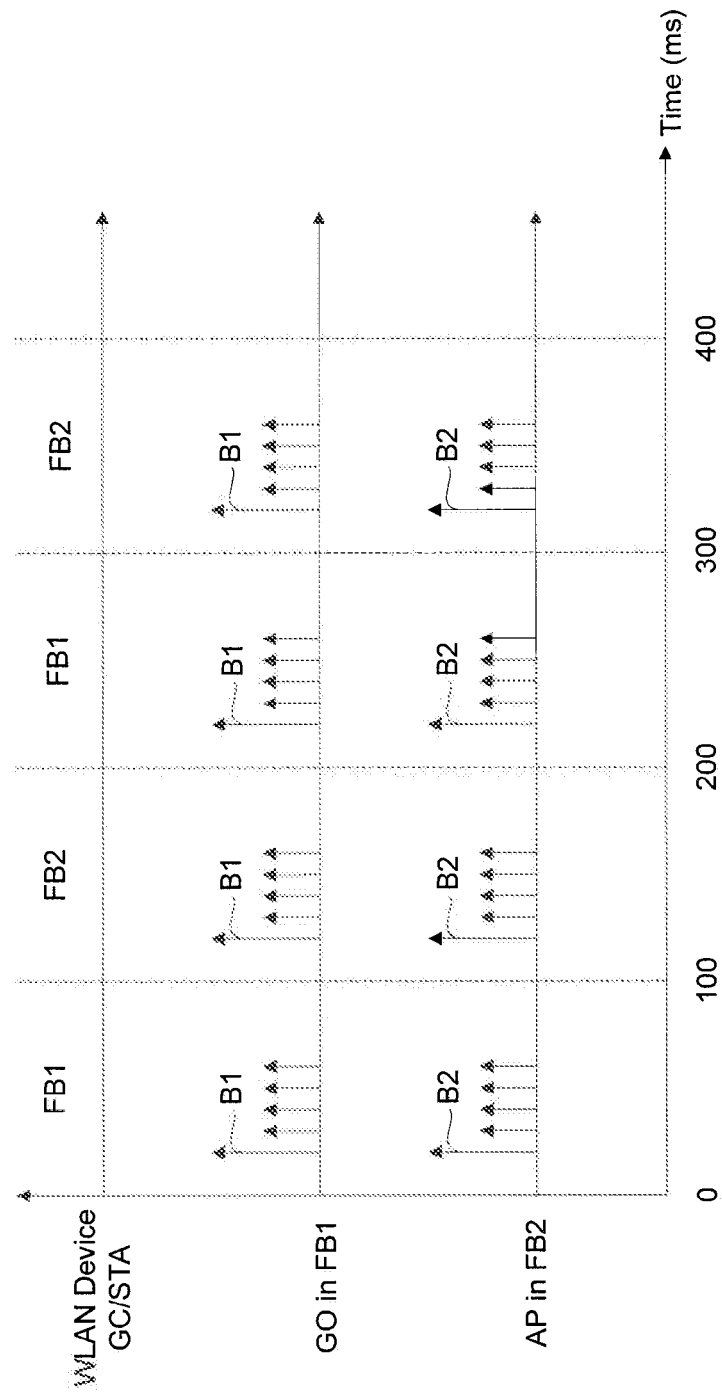
FIG. 4 illustrates an exemplary graph showing operation of a virtual WLAN device according to an embodiment of the present disclosure.

Second, FIG. 4 illustrates an exemplary graph showing a situation in which the beacons B1, B2 from the Group Owner and the Access Point overlap in time according to an embodiment of the present disclosure. For example, as illustrated in FIG. 4, the Group Owner may transmit beacon B1 and subsequent GO broadcast packets at the same time when the Access Point may transmit beacon B2 and subsequent AP broadcast packets. Further, the Group Owner may transmit beacon B1 and subsequent GO broadcast packets and the Access Point may transmit beacon B2 and subsequent AP broadcast packets at the same time interval of 100 ms. Therefore, the WLAN device 210 may decide not to limit communication with either the Group Owner or the Access Point to just a time slot portion that is 50 ms long. In particular, the WLAN device 210 may decide not to switch between the first and second time slot portions because only subsequent portions of the data would be received in the second time slot portion.

As a resolution, in one embodiment, the WLAN device 210 may decide to switch between communicating with the Group Owner in the first frequency band and communicating with the Access Point in the second frequency band at the predefined communication time slot of 100 ms. In this embodiment, at a time, the WLAN device 210 may only receive either the beacon B1 and subsequent GO broadcast packets transmitted by the Group Owner or the beacon B2 and subsequent AP broadcast packets transmitted by the Access Point. For example, as shown in FIG. 4, during the first communication timeslot (of 0-100 ms), the WLAN device 210 may only receive the beacon B1 and subsequent GO broadcast packets transmitted by the Group Owner, and then switch to the second communication timeslot (of 100-200 ms) to only receive the beacon B2 and subsequent AP broadcast packets transmitted by the Access Point, and so on. In this case, undesirably, the WLAN device 210 is unable to receive the beacon B2 and subsequent AP broadcast packets transmitted by the Access Point during the first timeslot (of 0-100 ms) and this data is lost. Similarly, the WLAN device 210 is unable to receive the beacon B1 and subsequent GO broadcast packets transmitted by the Group Owner during the second communication timeslot (of 100-200 ms), and this data is lost.

To avoid the above loss of data and to improve the overall efficiency, the present disclosure contemplates the transmission of an action frame from the WLAN device 210 to the Group Owner and/or the Access Point to inform the Group Owner and/or the Access Point of the information regarding the duration/interval of time for which the WLAN device 210 will be unavailable for communication to the Group Owner and/or the Access Point, respectively. In one embodiment, the WLAN device 210 may transmit the action frame in the current time slot and before switching to the next time slot.

Figure 5:
FIG. 5 illustrates an exemplary action frame according to an embodiment of the present disclosure.

FIG. 5 illustrates an exemplary action frame 500 according to an embodiment of the present disclosure. The WLAN device 210 may transmit the action frame 500 to the Group Owner and/or the Access Point to inform the Group Owner and/or the Access Point of the information regarding the duration/interval of time for which the WLAN device 210 will be unavailable for communication. The action frame 500 may include a plurality of fields. These fields may include an action frame identification field 501, a device identification field 502, and SDB off-channel information field 503, a time-stamp field 504, and a duration field 505. The action frame identification field 501 may include information identifying the action frame 500. The identification information may include information indicating that the action frame 500 is an action frame, information regarding the WLAN device 210 and/or information regarding a manufacturer or vendor of the WLAN device 210 and/or a timestamp indicating a transmission time of the action frame 500. The device identification field 502 may include information regarding the WLAN device 210 that may transmit the action frame 500. The SDB off-channel information field 503 may include information regarding the SDB operation of the WLAN device 210 during the duration/interval of time for which the WLAN device 210 will be unavailable for communication to the Group Owner and/m the Access Point. For example, the SDB off-channel information field 503 may include information indicating that the WLAN device 210 may be communicating with another device using SDB operation during the duration/interval of time for which the WLAN device 210 will be unavailable for communication to the Group Owner and/or the Access Point. Further, the SDB off-channel information field 503 may include information indicating that the WLAN device 210 is capable of operating in the SDB system and/or include a specific value assigned by the manufacturer or vendor of the WLAN device 210 that corresponds to the SDB operation of the WLAN device 210.

The time-stamp field 504 may include information regarding a given time at which the WLAN device 210 might become unavailable for communication to the Group Owner and/or the Access Point. Alternatively, the time-stamp field 504 may include information indicating that the given time at which the WLAN device 210 might become unavailable for communication may be the time when a future communication (e.g., null data frame) is transmitted from the WLAN device 210 or when a future communication (e.g., null data frame) is received by the Group Owner and/or the Access Point. The duration field 505 may include information regarding a duration/interval of time, starting from the given time indicated in the time-stamp field 504, for which the WLAN device 210 will be unavailable for communication to the Group Owner and/or the Access Point.

Figure 6:
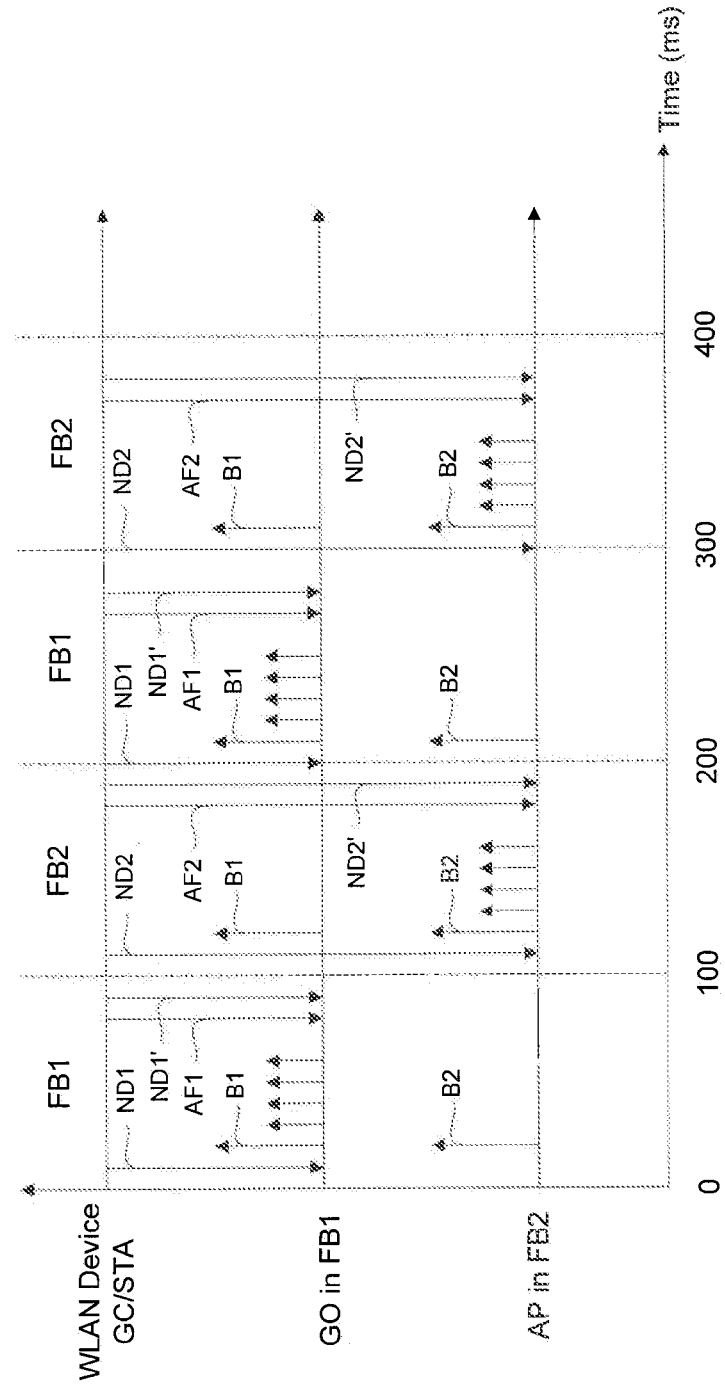
FIG. 6 illustrates an exemplary graph showing operation of a virtual WLAN device according to an embodiment of the present disclosure.

FIG. 6 illustrates a graph showing an exemplary resolution to the observed loss of data when the beacons B1, B2 from the Group Owner and the Access Point overlap in time, according to an embodiment of the present disclosure. In this embodiment, the WLAN device 210 may operate as the Group Client to communicate with the Group Owner in the first frequency band FB1 (e.g., 5 GHz) during the first predefined communication time slot of, for example, 100 ms. Then, the WLAN device 210 may operate as the Station to communicate with the Access Point in the second frequency band FB2 (e.g., 2.4 GHz) during the second predefined communication time slot of, for example, 100 ms, and so on.

As shown in FIG. 6, during the first predefined communication time slot, the WLAN device 210 may receive the beacon B1 and the subsequent GO broadcast packets from the Group Owner. Now, to avoid the loss of the beacon B1 and the subsequent GO broadcast packets in the second predefined communication time slot when the WLAN device 210 may operate as the Station to communicate with the Access Point, the WLAN device 210 may transmit the action frame 500 to the Group Owner prior to switching out of the first predefined communication time slot. For example, as shown in FIG. 6, the WLAN device 210 may transmit the action frame AF1 to the Group Owner informing the Group Owner of the information regarding the duration/interval of time for which the WLAN device 210 will be unavailable for communication to the Group Owner. In particular, the information regarding the duration/interval of time may include information indicating that the given time at which the WLAN device 210 might become unavailable for communication may be the time when a null data frame ND1' is transmitted from the WLAN device 210 or when a null data frame ND1' is received by the Group Owner. Further, information regarding the duration/interval of time may include information indicating that the WLAN device 210 may be unavailable for communication for an interval of 100 ms from the given time, which is the time period of a predetermined timeslot in this case. Other intervals could be used. Finally, the WLAN device 210 may then transmit the null data frame ND1' to inform the Group Owner that the WLAN device 210 is about to switch out from the first predefined communication time slot.

Upon receiving the action frame AF1 and the null data frame ND1', the Group Owner is informed that the WLAN device 210 will be unavailable for communication for 100 ms from the time of transmission/reception of the null data frame ND1'. Therefore, the Group Owner will not transmit at least any broadcast packets to the WLAN device 210 during the interval of 100 ms from the time of transmission/reception of the null data frame ND1', thereby preventing this data from being lost. Additionally, the transmission of the action frame 500 including information regarding the duration/interval of time for which the WLAN device 210 is unavailable for communication is useful because, rather than staying active to receive another communication from the WLAN device 210, the Group Owner may itself enter power save mode to save power or may communicate with another device during the interval of 100 ms from the time of transmission/reception of the null data frame ND1'.

Upon completion of the interval of 100 ms from the time of transmission/reception of the null data frame ND1', the Group Owner may become active to communicate with the WLAN device 210. Once the WLAN device 210 has switched into the third predefined communication time slot (200 ms-300 ms), the WLAN device 210 may transmit a null data frame ND1 to the Group Owner informing the Group Owner that the WLAN device 210 is now ready to communicate with the Group Owner. The Group Owner may row transmit the beacon B1 and the subsequent GO broadcast packets, which are properly received by the WLAN device 210.

Similar to the above communication with the Group Owner, the WLAN device 210 may transmit an action frame AF2 to the Access Point informing the Access Point of the information regarding the duration/interval of time for which the WLAN device 210 will be unavailable for communication to the Access Point. In particular, the information regarding the duration/interval of time may include information indicating that the given time at which the WLAN device 210 might become unavailable for communication may be the time when a null data frame ND2' is transmitted from the WLAN device 210 or when a null data frame ND2' is received by the Access Point. Further, information regarding the duration/interval of time may include information indicating that the WLAN device 210 may be unavailable for communication for interval of 100 ms from the given time, which is the time period of a predetermined timeslot in this case. Finally, the WLAN device 210 may then transmit the null data frame ND2' to inform the Access Point that the WLAN device 210 is about to switch out from the second predefined communication time slot.

Upon receiving the action frame AF2 and the null data frame ND2', the Access Point is informed that the WLAN device 210 will be unavailable for communication for 100 ms from the time of transmission/reception of the null data frame ND2'. Therefore, the Access Point will not transmit at least any broadcast packets to the WLAN device 210 during the interval of 100 ms from the time of transmission/reception of the null data frame ND2', thereby preventing this data from being lost. Additionally, the transmission of the action frame 500 including information regarding the duration/interval of time for which the WLAN device 210 is unavailable for communication is useful because, rather than staying active to receive another communication from the WLAN device 210, the Access Point may itself enter power save mode to save power or may communicate with another device during the interval of 100 ms from the time of transmission/reception of the null data frame ND2'.

Upon completion of the interval of 100 ms from the time of transmission/reception of the null data frame ND2', the Access Point may become active to communicate with the WLAN device 210. Once the WLAN device 210 has switched into the second predefined communication time slot (100 ms-200 ms), the WLAN device 210 may transmit a null data frame ND2 to the Access Point informing the Access Point that the WLAN device 210 is now ready to communicate with the Access Point. The Access Point may now transmit the beacon B2 and the subsequent AP broadcast packets, which are properly received by the WLAN device 210.

In this way, by explicitly informing the Group Owner and/or the Access Point poster duration/interval of time for which the WLAN device 210 will be unavailable for communication, the efficiency of communication between the WLAN device 210 and the Group Owner and/or the Access Point may be improved, and the loss of the broadcast packet data may be avoided.

Figure 7:
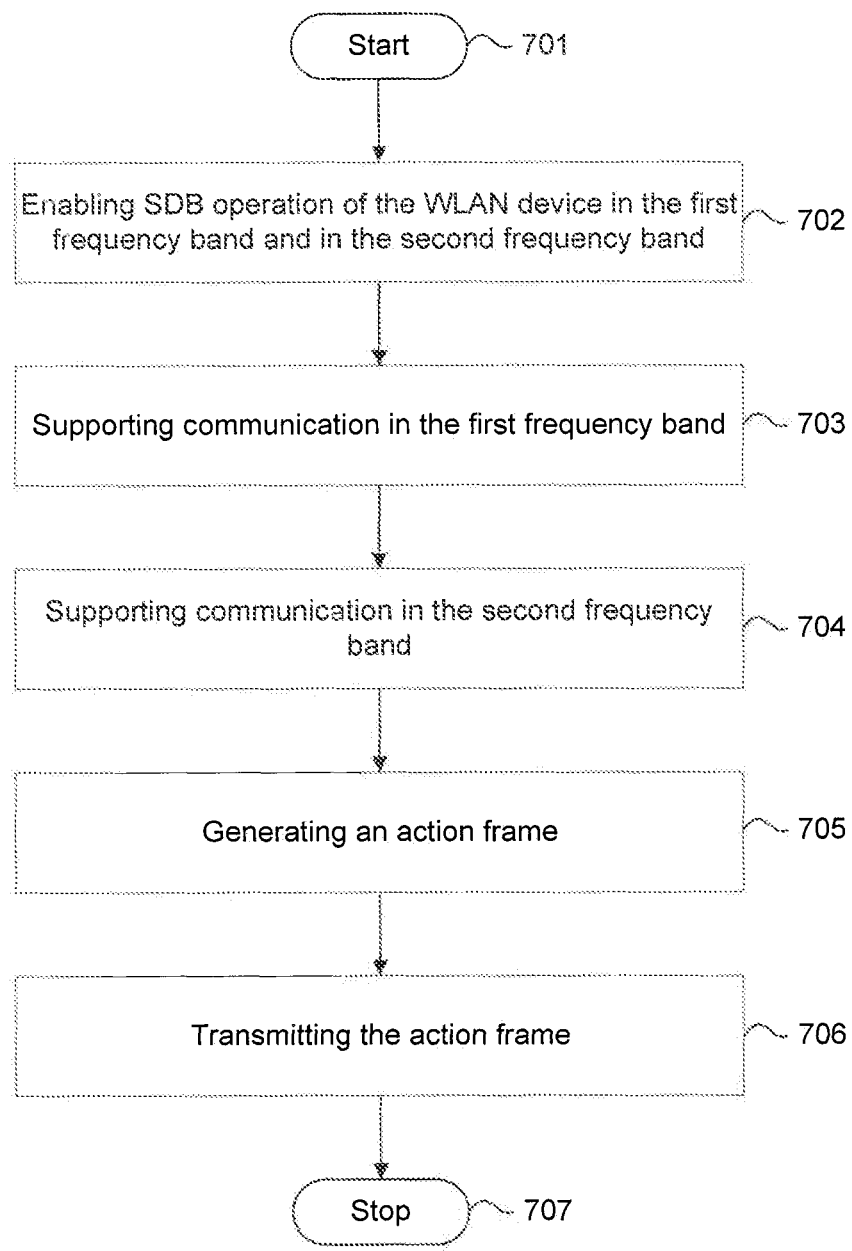
FIG. 7 illustrates an exemplary method according to an embodiment of the present disclosure.

FIG. 7 illustrates exemplary method 700 for conducting time arbitration messaging in the WLAN device according to an embodiment of the present disclosure. The method 700 is described with reference to the FIGS. 1-6. The steps described as being included in method 700 may be performed in a different order with respect to the order described below. Further, any of the steps described as being included in method 700 may be performed simultaneously or at different times.

The method 700 starts at step 701. At step 702, simultaneous dual band (SDB) operation of the WLAN device 210 is enabled through at least one antenna in the WLAN device 210. In one embodiment, the SDB operation includes the WLAN device 210 communicating in a first frequency band with a first device and communicating in a second frequency band with a second device. At step 703, the communication of the WLAN device in the first frequency band with the first device is supported by using, for example, first network interface circuitry. At step 704, the communication of the WLAN device in the second frequency band with the second device is supported by using, for example, second network interface circuitry. At step 705, an action frame is generated by using, for example, a processor of the WLAN device 210. In one embodiment, the generated action frame may include all or a part of the information regarding the duration/interval of time during which the WLAN device 210 will be unavailable for communication. At step 706, the action frame is transmitted through the at least one antenna to at least one of the first device and the second device. The method stops at step 707.

In one embodiment, enabling the DB operation may include enabling virtual DB operation including substantially simultaneous communication in the first frequency band and in the second frequency band. In one embodiment, enabling the DB operation may include enabling virtual DB operation including substantially simultaneous communication in the first frequency band, and in the second frequency band through a same antenna. Enabling the virtual DB operation may include enabling the substantially simultaneous communication in a time slot, the time slot being divided into a first portion for communication in the first frequency band and into a second portion for communication in the second frequency band. In one embodiment, enabling the substantially simultaneous communication in the time slot may include equally dividing the time slot for communication in the first frequency band and in the second frequency band. Enabling the substantially simultaneous communication in the time slot may include enabling sequential communication in the first frequency band during the first portion and in the second frequency band during the second portion.

In one embodiment, generating the at least one action frame may include generating a first action frame and a second action frame, and transmitting the at least one action frame may include transmitting the first action frame to the first device during the first portion and transmitting the second action frame to the second device during the second portion. The generating the at least one action frame may include generating the at least one action frame to include time-stamp information indicating a given time from which the WLAN device will be unavailable for communication, and time duration information indicating an interval for which the WLAN device will be unavailable for communication. In one embodiment, the given time from which the WLAN device will be unavailable for communication is a time associated with transmission of a null data frame from the WLAN device, and the interval for which the WLAN device will be unavailable for communication is an interval between transmission of a first null data frame and transmission of a second null data frame from the WLAN device.

In one embodiment, enabling the SDB operation may include enabling virtual SDB operation. The virtual SDB operation may include substantially simultaneous communication in the first frequency band and in the second frequency band. For example, enabling the virtual SDB operation may include enabling simultaneous communication in a given time slot, and the time slot may be divided, equally or unequally, for communication in the first frequency band and in the second frequency band.

In one embodiment, generating the action frame may include generating the action frame to include all or a part of the information regarding the duration/interval of time during which the WLAN device 210 will be unavailable for communication. In one embodiment, the generating of the action frame may include generating the action frame that includes a time-stamp field configured to include a given time at which the WLAN device 210 might become unavailable for communication. Alternatively, the time-stamp field 504 may include information indicating that the given time at which the WLAN device 210 might become unavailable for communication may be the time when a future communication (e.g., null data frame) is transmitted from the WLAN device 210 or when a future communication (e.g., null data frame) is received by the Group Owner and/or the Access Point. In one embodiment, the generated action frame may include a duration field 505 have includes information regarding a duration/interval of time, starting from the given time indicated in the time-stamp field 504, for which the WLAN device 210 will be unavailable for communication.

Figure 8:
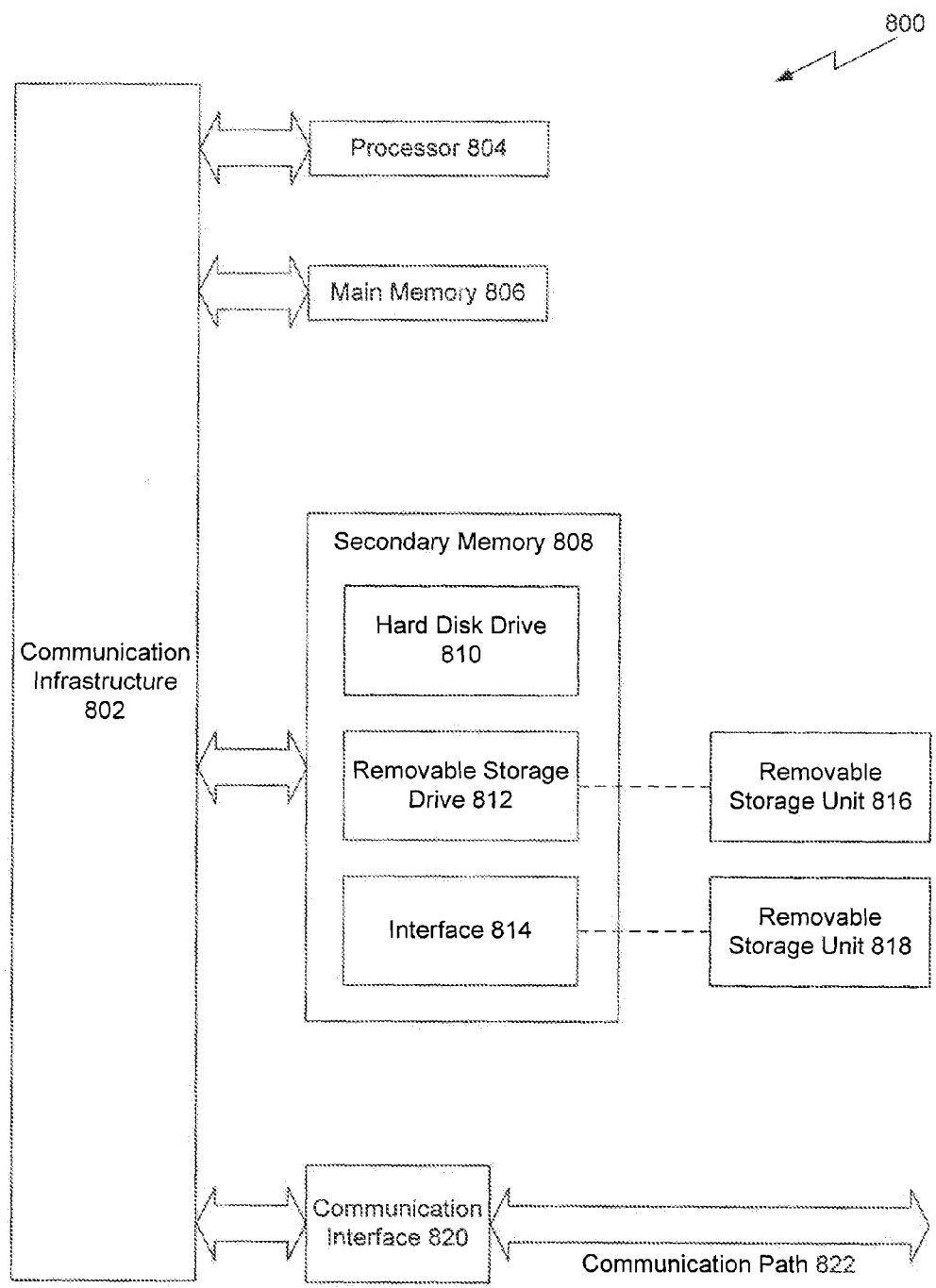
FIG. 8 illustrates an exemplary general purpose computer according to an embodiment of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 800 is shown in FIG. 8. One or more of the features depicted in the figures (e.g., WLAN device 210, network interface circuitry, front-end units, etc.) and their corresponding algorithms can be executed on one or more distinct computer systems 800, or a portion thereof. Furthermore, any functions performed by any of the above features can be implemented on one or more distinct computer systems 800.

A computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCM-CIA slot and card, etc. Software and data transferred via communications interface 820 are in the form of signals which may be electronic, electromagnetic, optical, or other signals capable of being received by the WLAN device. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to non-transitory, tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800. To implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using a removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

In the above description, numerous specific details are set forth in order to provide a thorough understanding of the disclosure. However, it will be apparent to those skilled in the art that the disclosure including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, stricture, or characteristic in connection with other embodiments whether or not explicitly described.

It is to be appreciated that the Detailed Description section, and not the Abstract section, is intended to be used to interpret the claims. The Abstract section may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A wireless local area network (WLAN) device to provide dual band (DB) operation of the WLAN device, the DB operation including communication in a first frequency band with a first device and communication in a second frequency band with a second device, the WLAN device comprising:
network interface circuitry configured to support communication in the first frequency band with the first device and communication in the second frequency band with the second device; and
a processor configured to:
  generate at least one action frame that includes information regarding a duration of time during which the WLAN device will be unavailable for communication, wherein the information further includes a given start time from which the WLAN device will be unavailable for communication that is a time associated with transmission of a future communication from the WLAN device;
  enable transmission of the at least one action frame to the first device or to the second device using the network interface circuitry; and
  generate the future communication and enable transmission of the future communication to the first device or to the second device using the network interface circuitry.

2. The WLAN device of claim 1, further comprising: an antenna, wherein the DB operation comprises virtual DB operation including communication in the first frequency band and in the second frequency band through the antenna.

3. The WLAN device of claim 2, wherein the virtual DB operation includes the communication in a time slot, the time slot being divided into a first portion for communication in the first frequency band and into a second portion for communication in the second frequency band.

4. The WLAN device of claim 3, wherein the time slot is divided equally for communication in the first frequency band and communication in the second frequency band.

5. The WLAN device of claim 3, wherein the communication in the time slot includes sequential communication in the first frequency band during the first portion and in the second frequency band during the second portion.

6. The WLAN device of claim 1, further comprising:
an antenna, wherein
the DB operation comprises virtual DB operation including the communication in the first frequency band and the communication in the second frequency band through the antenna,
the virtual DB operation includes communication in time slots,
the at least one action frame includes a first action frame and a second action frame, and
the processor is further configured to enable transmission of the first action frame to the first device during a first time slot of the time slots, and to enable transmission of the second action frame to the second device during a second time slot of the time slots.

7. The WLAN device of claim 1, wherein the at least one action frame comprises:
time duration information indicating an interval for which the WLAN device will be unavailable for communication.

8. The WLAN device of claim 7, wherein the interval for which the WLAN device will be unavailable for communication is an interval between transmission of a first null data frame and transmission of a second null data frame from the WLAN device.

9. The WLAN device of claim 1, wherein the future communication is a null data frame from the WLAN device.

10. A method for use in a wireless local access network (WLAN) device, the method comprising:
enabling dual band (DB) operation that includes communication in a first frequency band with a first device and communication in a second frequency band with a second device;
supporting, by network interface circuitry, communication in the first frequency band with the first device and communication in the second frequency band with the second device;
generating, by a processor, at least one action frame that includes information regarding a duration of time during which the WLAN device will be unavailable for communication, wherein the information further includes a given start time from which the WLAN device will be unavailable for communication that is a time associated with transmission of a future communication from the WLAN device;
transmitting the at least one action frame to the first device or to the second device; and
generating the future communication and transmitting the future communication to the first device or to the second device.

11. The method of claim 10, wherein enabling the DB operation comprises enabling virtual DB operation including communication in the first frequency band and communication in the second frequency band through a same antenna.

12. The method of claim 11, wherein enabling the virtual DB operation comprises enabling the communication in a time slot, the time slot being divided into a first portion for communication in the first frequency band and into a second portion for communication in the second frequency band.

13. The method of claim 12, wherein enabling the communication in the time slot comprises equally dividing the time slot for communication in the first frequency band and communication in the second frequency band.

14. The method of claim 13, wherein enabling the communication in the time slot comprises enabling sequential communication in the first frequency band during the first portion and in the second frequency band during the second portion.

15. The method of claim 10, wherein
enabling the DB operation includes communicating in time slots;
the generating the at least one action frame comprises generating a first action frame and a second action frame; and
the transmitting the at least one action frame comprises transmitting the first action frame to the first device during a first time slot of the time slots and transmitting the second action frame to the second device during a second time slot of the time slots.

16. The method of claim 10, wherein the generating the at least one action frame comprises generating the at least one action frame to include time duration information indicating an interval for which the WLAN device will be unavailable for communication.

17. The method of claim 16, wherein the future communication is a null data frame from the WLAN device.

18. The method of claim 16, wherein the interval for which the WLAN device will be unavailable for communication is an interval between transmission of a first null data frame and transmission of a second null data frame from the WLAN device.

19. A wireless local area network (WLAN) device to provide dual band (DB) operation of the WLAN device, the DB operation including wireless communication in a first frequency band with a first device and wireless communication in a second frequency band with a second device, the WLAN device comprising:
network interface circuitry configured to support the wireless communication in the first frequency band with the first device and the wireless communication in the second frequency band with the second device; and
a processor configured to:
generate an action frame that indicates the WLAN device will be unavailable for wireless communication with the first device for a specified duration of time, wherein the action frame further indicates a given start time from which the WLAN device will be unavailable for communication that is a time associated with transmission of a future communication from the WLAN device, and indicates DB operation capabilities of the WLAN device; and
generate a null data frame that indicates the WLAN device is ready for wireless communication with the second device; and
enable transmission of the action frame to the first device and the null data frame to the second device using the network interface circuitry.

\* \* \* \* \*